(12) United States Patent
Carrier (10) Patent No.: US 11,017,117 B2
(45) Date of Patent: May 25, 2021

(54) PRE-FIREWALL DATA CLASSIFICATION

(71) Applicant: BANK OF AMERICA CORPORATION, Charlotte, NC (US)

(72) Inventor: Nancy Carrier, Jacksonville, FL (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 296 days.

(21) Appl. No.: 16/237,971

(22) Filed: Jan. 2, 2019

(65) Prior Publication Data
US 2020/0210613 A1  Jul. 2, 2020

(51) Int. Cl.
| G06F 21/62 | (2013.01) |
| H04L 29/06 | (2006.01) |
| G06N 20/00 | (2019.01) |
| G06F 16/35 | (2019.01) |
| G06F 16/14 | (2019.01) |
| G06F 40/117 | (2020.01) |
| G06F 40/166 | (2020.01) |

(52) U.S. Cl.
CPC .......... *G06F 21/6245* (2013.01); *G06F 16/14* (2019.01); *G06F 16/35* (2019.01); *G06F 40/117* (2020.01); *G06F 40/166* (2020.01); *G06N 20/00* (2019.01); *H04L 63/0227* (2013.01)

(58) Field of Classification Search
CPC ...... G06F 21/6245; G06F 16/14; G06F 16/35; G06F 40/1666; G06F 40/117; G06N 20/00; H04L 63/0227
See application file for complete search history.

(56) References Cited

U.S. PATENT DOCUMENTS

| 5,623,601 | A | 4/1997 | Vu |
| 6,088,796 | A | 7/2000 | Cianfrocca et al. |
| 6,243,815 | B1 | 6/2001 | Antur et al. |
| 6,304,906 | B1 * | 10/2001 | Bhatti ................. H04L 12/2856 370/395.43 |
| 7,003,118 | B1 | 2/2006 | Yang et al. |
| 7,484,097 | B2 | 1/2009 | Steiger et al. |
| 7,685,436 | B2 | 3/2010 | Davis et al. |
| 7,779,255 | B2 | 8/2010 | LiVecchi |
| 7,849,059 | B2 | 12/2010 | Prahlad et al. |
| 7,853,998 | B2 | 12/2010 | Blaisdell et al. |
| 7,937,345 | B2 | 5/2011 | Schmidtler et al. |
| 7,954,151 | B1 | 5/2011 | Nisbet et al. |
| 7,958,067 | B2 | 6/2011 | Schmidtler et al. |
| 8,037,290 | B1 | 10/2011 | Stutton |

(Continued)

*Primary Examiner* — Hee K Song
(74) *Attorney, Agent, or Firm* — Michael A. Springs; Moore & Van Allen PLLC; James C. Edwards (57) ABSTRACT

Classification of personal data in incoming or outgoing data files in-line or pre-firewall. The invention determines which data owners and/or data associated with the data owners requires classification (e.g., which individuals/customers and/or data is applicable to internal or external regulations) and, subsequently determines the classifications and identifies the classifications in the data file the data owners and data within the data file so that the data can be routed according to the identified classifications. In specific embodiments machine-learning processing is used to learn, determine and/or predict which data owners and/or data associated with the individual/customers requires classification and the classifications to assign to those data owners and/or data elements.

14 Claims, 6 Drawing Sheets

(56) References Cited

U.S. PATENT DOCUMENTS

| | | | |
|---|---|---|---|
| 8,037,518 B2 | 10/2011 | Buer | |
| 8,205,239 B1 * | 6/2012 | Satish | H04L 63/126 726/1 |
| 8,239,335 B2 | 8/2012 | Schmidtler et al. | |
| 8,285,685 B2 | 10/2012 | Prahlad et al. | |
| 8,355,706 B2 | 1/2013 | Quigley et al. | |
| 8,374,977 B2 | 2/2013 | Schmidtler et al. | |
| 8,406,525 B2 | 3/2013 | Ma et al. | |
| 8,458,186 B2 | 6/2013 | Stringham et al. | |
| 8,468,244 B2 | 6/2013 | Redlich et al. | |
| 8,589,397 B2 | 11/2013 | Fujimaki | |
| 8,677,505 B2 | 3/2014 | Redlich et al. | |
| 8,719,197 B2 | 5/2014 | Schmidtler et al. | |
| 9,014,026 B2 | 4/2015 | Raleigh | |
| 9,015,301 B2 | 4/2015 | Redlich et al. | |
| 9,143,529 B2 | 9/2015 | Qureshi et al. | |
| 9,176,978 B2 | 11/2015 | Wideman | |
| 9,324,022 B2 | 4/2016 | Williams, Jr. et al. | |
| 9,501,744 B1 | 11/2016 | Brisebois et al. | |
| 9,740,764 B2 | 8/2017 | Lunde | |
| 9,779,260 B1 * | 10/2017 | Brisebois | G06F 21/6227 |
| 9,892,273 B2 | 2/2018 | Nussey et al. | |
| 9,940,783 B2 | 4/2018 | Simmer | |
| 10,554,809 B1 * | 2/2020 | Edwards | H04M 3/2218 |
| 10,594,656 B2 | 3/2020 | Devarajan et al. | |
| 2008/0244697 A1 | 10/2008 | Himmel et al. | |
| 2014/0079056 A1 | 3/2014 | Wei et al. | |
| 2014/0344234 A1 | 11/2014 | Amarendran et al. | |
| 2018/0013730 A1 * | 1/2018 | Ling | G06F 21/6209 |
| 2018/0041470 A1 | 2/2018 | Schultz et al. | |
| 2019/0377745 A1 | 12/2019 | Nair et al. | |

\* cited by examiner

PRE-FIREWALL DATA CLASSIFICATION

FIELD OF THE INVENTION

The present invention is generally directed to data security and, more specifically, a system that provides for pre-firewall data classification of data being received at or transmitted from an enterprise.

BACKGROUND

Data security in the digital time-period is a constant concern. Unfortunately, data breaches, in which an unauthorized entity retrieves, accesses or otherwise views data are becoming more common place. Many of these data breaches involve personal data associated with individuals, such as names, addresses, telephone numbers, account numbers, government-issued identifiers and the like. When such data is in the wrongful possession of an unauthorized entity, the individual associated with the data is exposed to various perils, such as, having their identity and/or financial resources misappropriated.

As a means of trying to protect against such data breaches, governments and other regulatory entities have recently initiated stringent regulations for protecting personal data which require adherence by entities that possess such data. For example, the European Union (EU), has recently established the General Data Protection Regulation (GDPR) on data protection and privacy for all individuals within the EU and additionally addresses the export of personal data outside of the EU.

Many large enterprises, such as retail businesses and financial institutions, are required to possess personal data (i.e., customer data) as a means of conducting business. In this regard, many of these large enterprises digitally communicate, on an ongoing basis, data files that contain personal information. For examples, such data files may include records of transactions conducted by customers, specifics of loan held or applied for by customers and the like most of which include some form of the customer's personal data. In many instances, once the data files are received within the large enterprise the data therein is immediately distributed to various repositories and/or applications, which rely on the data to conduct an associated task. However, once the data files have been received and the data therein is disseminated to the various repositories and/or applications it becomes more complex and more costly to control the data in a consistent manner and, more specifically, insure that both internal and external (i.e., government regulations) procedures related to viewing, accessing using the data and the like are adhered to.

Moreover, the aforementioned data files typically contain data that is required to be acted upon or processed in a highly efficient manner in order to meet the time constraints associated with the tasks at hand. As such, when data files are received at a point of entry within an enterprise it may be inconceivable or impractical, due to such time constraints, to validate or otherwise pre-process all of the data included in the file as a means of controlling the data/insuring compliance to internal and/or external standards and regulations.

Therefore, a need exists to develop systems, apparatus, methods or the like for classifying personal data at or before a point of entry/exit within an enterprise. In this regard, the desired system, apparatus, methods or the like should be capable of determining which individuals/customers and/or data associated with the individual/customers requires classification (e.g., which individuals/customers and/or data falls within the context of internal or external regulations) and, subsequently classify and identify the individuals/customers and data within the data file so that subsequent downstream applications or storage locations, in possession of the data, can acknowledge the individuals/customers and data to insure compliance to the regulations and the like. By providing for classification at or before entry exit (i.e., in-line or pre-firewall) the present invention is able to insure that data which requires special handling is not proliferated throughout the enterprise absent knowledge of the need to implement the rules associated with the internal/external standards and regulations.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, apparatus, methods and/or the like for classifying personal data in incoming or outgoing data files at or before a point of entry/exit within an enterprise, such as in-line or pre-firewall. In this regard, the present invention is capable of determining which individuals/customers and/or data associated with the individual/customers requires classification (e.g., which individuals/customers and/or data is applicable to internal or external regulations) and, subsequently classify and identify the individuals/customers and data within the data file so that the data can be routed according to the identified classifications (i.e., subsequent downstream applications or storage locations, in possession of the data, can acknowledge the individuals/customers and data to insure compliance to the regulations and the like). By providing for classification in-line with or pre-firewall the present invention is able to insure that data which requires special handling is not distributed throughout the enterprise absent knowledge of the need to implement the rules associated with the internal/external standards and regulations.

In specific embodiments of the invention, machine-learning processing is implemented to progressively learn, over-time, which data owners require classifications (e.g., covered by applicable regulations/standards) and/or which data elements within the data file require classification). Moreover, the machine-learning processing may be further implemented to progressively learn, over-time, which classification should be assigned to the data owners and/or associated data elements. Moreover, the machine-learning processing may be used to predict, along with data file metadata and/or enterprise-wide composite metadata, which classification should be assigned to the data owners and/or associated data elements.

A system for data security defines first embodiments of the invention. The system includes a trusted internal computing network and a firewall that monitors and controls network traffic (i) inbound to the trusted internal computing network from an untrusted external computing network, and (ii) outbound from the trusted internal computing network to the untrusted external computing network based on predetermined security rules. The network traffic includes data files comprising a plurality data elements, each data element associated with one of one or more data owners. The system additionally includes a computing platform including a memory and one processor in communication with the memory. The memory stores instructions that are executable by the at least processor prior to or in-line with the firewall monitoring and controlling the network traffic. The instructions are configured to receive (i) inbound ones of the data files, and (ii) outbound ones of the data files. Once the data files have been received, the instructions are configured to determine a first data security classification for at least one of the one or more data owners associated with the data elements in the received data files. In response to determining a first data security classification for at least one of the data owners, the instructions are configured to determine which of the data elements associated with determined data owners require classification and determine a second data security classification for each of the determined data elements. The instructions are further configured to identify, within the data file, at least one of (i) the first data security classification for the at least one of the one or more data owners, and (ii) the second data security classification for the each of the determined data elements.

In specific embodiments of the system, the instructions include machine learning instructions that are configured to progressively learn at least one of first data security classifications for data owners and second data security classifications for data elements associated with the data owners based on previous processing of data files by the instructions. In such embodiments of the system, the instructions are further configured to determine the first data security classification and/or the second data security classification based on the first and second data security classifications learned by the machine learning instructions. In further related embodiments of the system, the machine learning instructions are further configured to, in response to failing to determine the first data security classification and/or the second data security classification based on the first and second data security classifications learned by the machine learning instructions, predict the first data security classification and/or the second data security classification based on (i) learned classifications of other data files, (ii) metadata included in the data file, and/or (iii) composite metadata compiled within the trusted internal computing network.

In other specific embodiments of the system, the instructions are further configured to determine the first data security classification and/or the second data security classification by accessing at least one database that stores data owner classifications and/or data element classifications.

In still further specific embodiments of the system, the instructions are further configured to determine a third data security classification for the data file and identify, within the data file, the third data security classification for the data file. In such embodiments of the system, the instructions may further include machine learning instructions configured to progressively learn third data security classifications for the data files based on previous processing of data files by the instructions. In related embodiments of the system, the instructions are further configured to determine the third data security classification based on the third data security classifications learned by the machine learning instructions and the machine learning instructions are further configured to, in response to failing to determine the third data security classification based on the third data security classifications learned by the machine learning instructions, predict the third data security classification based the (i) learned classifications of other data files, (ii) metadata included in the data file, and/or (iii) composite metadata compiled within the trusted internal computing network.

In still further specific embodiments of the system, the instructions are further configured to identify, within the data file, the second data security classification for the each of the determined data elements by tagging metadata associated with each of the determined data elements, and/or adding data fields to the data file In other specific embodiments of the system, the instructions are further configured to determine (i) one or more applications within the trusted internal computing network that use the determined data elements, and/or (ii) one or more storage location associated with the trusted internal computing network that is impacted by the second data security classification. In such embodiments of the system, the instructions may be further configured to notify the determined (i) one or more applications and (ii) one or more storage locations of impending use or receipt of the determined data elements.

In yet other specific embodiments of the system, the second data security classification for the each of the determined data elements define one or more rules associated with the protection of the determined data elements, wherein the one or more rules include at least one of (i) rules defining where a data element can be stored, (ii) rules defining where a data element can be used, (iii) rules defining how a data element can be used, (iv) rules defining entities authorized to access or use a data element, (v) rules defining third-party requests to access or use a data element, (vi) rules defining statistical use of a data element, and (vii) rules defining encryption requirements for a data element.

Moreover, in further specific embodiments of the system, the instructions are further configured to validate the determined data elements by accessing a source of truth database to compare the determined data elements to previously verified data elements. In such embodiments of the invention, the instructions may be further configured to prevent one or more of the determined data elements that have been determined to be invalid from entering the trusted internal computing network.

An apparatus configured for data security provides for second embodiments of the invention. The apparatus includes a computing platform having a memory and at least one processor in communication with the memory. The apparatus further includes instructions stored in the memory that are executable by the at least processor prior to or in-line with a firewall monitoring and controlling inbound and outbound communications between an trusted internal computing network and an untrusted external computing network. The instructions are configured to receive (i) inbound data files from the untrusted external computing network, and (ii) outbound data files for communication to the untrusted external computing network. In response to receiving a data file, the instructions are further configured to determine a first data security classification for at least one of the one or more data owners associated with the data elements in the received data files. In response to determining a first data security classification for a data owner, the instructions are further configured to determine which of the data elements associated with the at least one of the one or more data owners require classification and determine a second data security classification for each of the determined data elements. In response, the instructions are further configured to identify, within the data file, at least one selected from the group of (i) the first data security classification for the at least one of the one or more data owners and (ii) the second data security classification for the each of the determined data elements.

In specific embodiments of the apparatus, the instructions are further include machine learning instructions configured to progressively learn first data security classifications for data owners and/or second data security classifications for data elements associated with the data owners based on previous processing of data files by the instructions.

In related embodiments of the apparatus, the instructions are further configured to determine the first data security classification and/or the second data security classification based on the first and second data security classifications learned by the machine learning instructions. In such embodiments of the apparatus, the machine learning instructions are further configured to, in response to failing to determine the first data security classification and/or the second data security classification based on the first and second data security classifications learned by the machine learning instructions, predict the first data security classification and/or the second data security classification based on (i) learned classifications of other data files, (ii) metadata included in the data file, and/or (iii) composite metadata compiled within the trusted internal computing network.

A computer-implemented method for providing data security provides for third embodiments of the invention. The computer-implemented method is implemented by one or more processing devices. The method is performed prior to or in-line with a firewall monitoring and controlling inbound and outbound communications between an trusted internal computing network and an untrusted external computing network. The method includes receiving (i) inbound data files from the untrusted external computing network, and (ii) outbound data files for communication to the untrusted external computing network. In response to receiving a data file, the method includes determining a first data security classification for at least one of the one or more data owners associated with the data elements in the data files. In response to determining a first data security classification, the method further includes determining which of the data elements associated with the at least one of the one or more data owners require classification and determining a second data security classification for each of the determined data elements. In response, the method includes identifying, within the data file, at least one selected from the group of (i) the first data security classification for the at least one of the one or more data owners and (ii) the second data security classification for the each of the determined data elements.

Thus, according to embodiments of the invention, which will be discussed in greater detail below, the present invention provides for classifying personal data in incoming or outgoing data files at or before a point of entry/exit within an enterprise, such as in-line or pre-firewall. By classifying data before or in-line with firewall monitoring, the present invention insures that data requiring special handling under applicable regulations and/or standards is properly identified and routed to downstream applications and storage locations. Specific embodiments of the invention rely on machine learning processing to progress lively learn and/or assist in predicting which data owners and/or data elements require classification and the classification that is assigned to data owners and/or data elements determined to require classification.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the disclosure in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, systems, apparatus, and methods are described in detail below for systems, apparatus, methods and/or the like for classifying personal data in incoming or outgoing data files at or before a point of entry/exit within an enterprise, such as in-line or pre-firewall. In this regard, the present invention is capable of determining which individuals/customers and/or data associated with the individual/customers requires classification (e.g., which individuals/customers and/or data is applicable to internal or external regulations) and, subsequently classify and identify the individuals/customers and data within the data file so that the data can be routed according to the identified classifications (i.e., subsequent downstream applications or storage locations, in possession of the data, can acknowledge the individuals/customers and data to insure compliance to the regulations and the like). By providing for classification in-line with or pre-firewall the present invention is able to insure that data which requires special handling is not distributed throughout the enterprise absent knowledge of the need to implement the rules associated with the internal/external standards and regulations.

In specific embodiments of the invention, machine-learning processing is implemented to progressively learn, over-time, which data owners require classifications (e.g., covered by applicable regulations/standards) and/or which data elements within the data file require classification). Moreover, the machine-learning processing may be further implemented to progressively learn, over-time, which classification should be assigned to the data owners and/or associated data elements. Moreover, the machine-learning processing may be used to predict, along with data file metadata and/or enterprise-wide composite metadata, which classification should be assigned to the data owners and/or associated data elements.

In further specific embodiments of the invention, the data file itself may be classified/categorized based on a determined topic or subject matter of the data file. In such embodiments of the invention, machine learning processing may be implemented to progressively learn, over time, data file topics/subject matter and determine/predict a classification based on the data file topic/subject matter.

Figure 1:
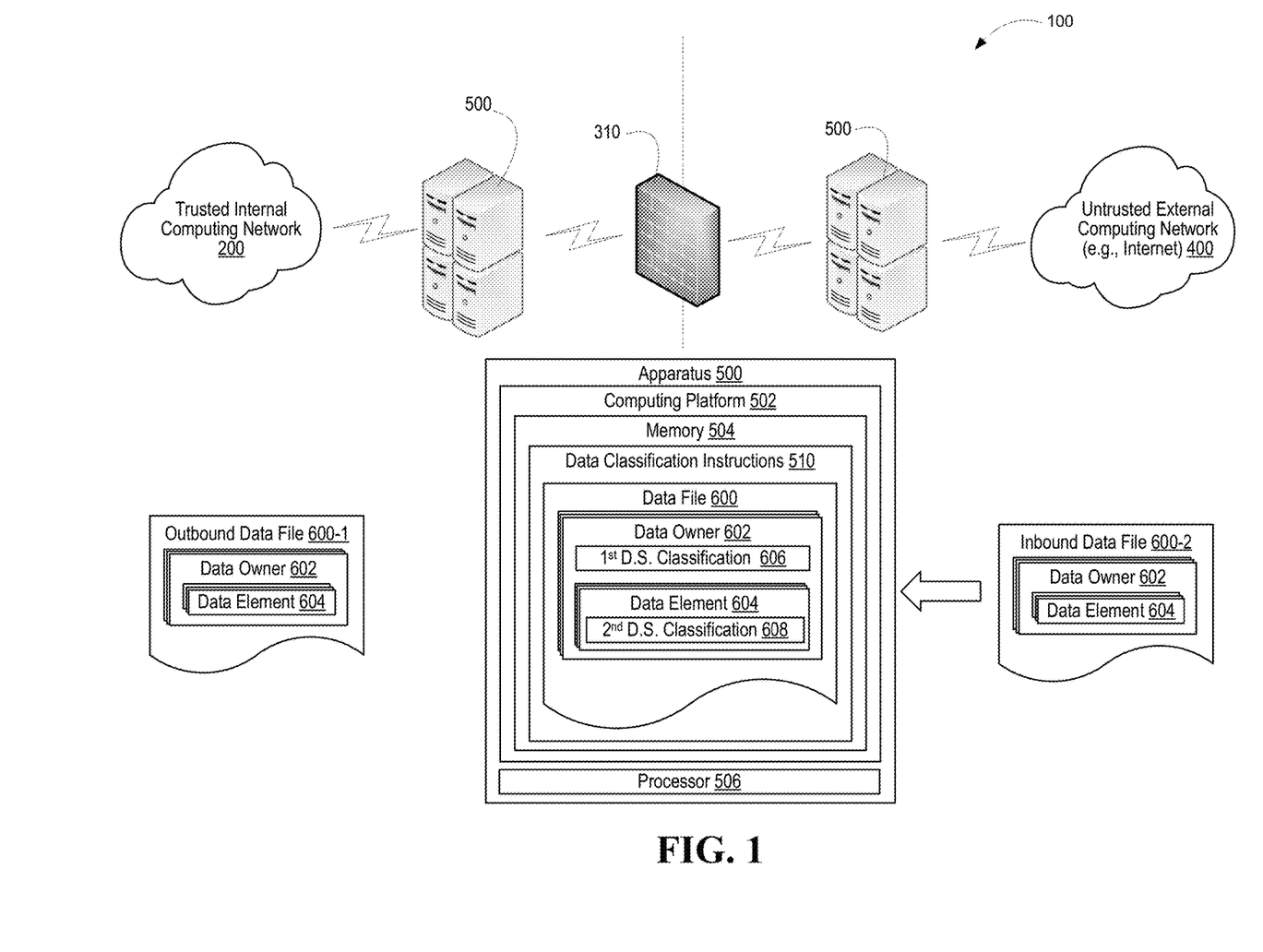
FIG. 1 is a schematic diagram of a system for classifying data owners and/or data elements in incoming or outgoing data files in-line or pre-firewall, in accordance with some embodiments of the present disclosure.

Turning now to the figures, FIG. 1 is a schematic/block diagram of an exemplary system 100 for data security and, more specification, a system for classifying data owners and/or data elements in data file being communication prior to or in-line with a firewall, in accordance with embodiments of the present invention. The system 100 includes a trusted internal computing network 200, such as an intranet within an enterprise or the like. The system additionally includes a firewall 310 that is the gateway between the trusted internal computing network 200 and the untrusted external computing network 400, such as the Internet or the like. The firewall is configured to monitor and control network traffic. The network traffic includes (i) inbound network traffic from an untrusted external computing network 400 to the trusted internal computing network 200, and (ii) outbound network traffic from the trusted internal computing network 200 to the untrusted external computing network 400. The network traffic includes data files 600 that includes a plurality of data elements 604, which may be associated with a data owner 602. The data owner 602, as used herein, is the individual or entity that is associated with or possesses a data element 604 (e.g., an individual or entity (i.e., data owner) is associated with/possesses an address, a telephone number, an account number, social security number or the like). In large enterprises, such as financial institutions, retailers or the like, such data files are communicated between such enterprises on a regular and ongoing basis.

The system 100 additionally includes an apparatus 500 that is configured to classify/categorize data owners 602 and/or data elements 604 in the data file 600 prior to or in-line with the firewall 310. Similar to intrusion protection, which provides for an enterprise to detect and deny entities, such as hackers or the like from entering their trusted internal computing network, the present invention provides for data protection (i.e., data or data owners that require classification/categorization is performed before the data (i)

enters the trusted internal computing network 200 from the untrusted external computing network 400, and/or (ii) exits the internal computing network 200 to the untrusted external computing network 400. Such classification/categorization of data requiring such classification/categorization at the point of entry (i.e., in-line with or prior to the firewall 310) adds a level of assurance that once the data enters and/or exits the trusted internal computing network, the data is accessed/stored or meets or other criteria associated with the classification/categorization regardless of which internal application/system receives the data and/or which external entity receives the data.

As such, apparatus 500 which may comprise one or more computing devices, such as servers or the like, may be in direct communication with the firewall 500. In specific embodiments of the invention (as shown in FIG. 1), the apparatus 500 comprising multiple computing devices may be positioned on both sides of the firewall so as to accommodate both outbound data files 600 and inbound data files 600-2. In other embodiments of the invention, the apparatus 500 may be positioned within the untrusted external computing network 400 (or between the untrusted external computing network 400 and the firewall 310) to allow for the classification/categorization of categorize data owners 602 and/or data elements 604 in the inbound data files 600-2 and the outbound data files 600-1. In other embodiments of the invention, the functionality embodied in apparatus 500 may be performed in-line with the firewall 310. In such embodiments of the invention, apparatus 500 may be positioned in parallel with the firewall 310 or the functionality of apparatus 500 may be included in the computing devices comprising the firewall 310 (thus, obviating the need for apparatus 500).

The apparatus 500 includes a computing platform 502 having a memory 504 and a processor 506 in communication with the memory 504. The memory 504 stores data classification instructions 510, which are executable by the processor 506. The data classification instructions 510 are configured to receive the outbound data files 600-1 and the inbound data files 600-2.

The data classification instructions are further configured to determine a first data security classification 606 for one or more of the data owners 602 associated with data elements 604 in the received data files 600. In this regard, the instructions 510 are configured to identify which data owners 602 have data elements 604 in the data file and, once the data owners 602 have been identified, determine which data owners 602 are subject to a data security classification/categorization. In this regard, not all of the data owners 602 having data elements 604 in a specific data file 600 may be subject to classification/categorization. For example, only data owners that fall within a specific government regulatory standard and/or meet internal classification/categorization guidelines will require classification/categorization. Data owners 602 may be identified by verifying one or more identifying data elements 604 in the data file 600, such as name, address, telephone number, account number or the like. Verification may provide for comparing the data elements 604 in the data file 600 to a source of truth, such as database that federates data owners based on previously verified data owner identifying data, such as verified, name, address, telephone number or the like account number.

In response to identifying the data owners, the instructions 510 determine which of the identified data owners 602 require the first data security classification 606 and determine which first data security classification 606 to assign those data owners 602. In specific embodiments of the system, such determinations may be made by accessing a database that lists data owners requiring the first data security classification 606 and the first data security classification(s) 606 to be assigned to those data owners 602.

In other embodiments of the system, machine learning instructions (shown and discussed in greater detail with regards to FIG. 3) are included within instructions 510. Machine learning instructions provide for progressively learning, based on data files 600 previously processed by the data classification instructions 510, which data owners 602 require first data security classification 606 and/or the first data security classification 606 to assign to the those data owners 602. In such embodiments of the invention, subsequent determination by the instructions 510 as to which data owners require the first data security classification and which classification to assign may be a prediction based on the data learned by the machine learning instructions, as well as, in some embodiments other data that heighten the accuracy of the prediction, such as metadata associated with the data file 600 and/or internally-accessible collaborative metadata collected over time from various metadata sources.

The data classification instructions are further configured to determine which of the data elements 604 associated the identified data 602 owners require second data security 608 classification and, in response, determine one or more second data security classifications 608 for each of the determined data elements 604. It should be noted that in most instances, the need for timely and efficient data file communication and processing speed limitations, make it impractical to classify/categorize all the data owners 602 and/or data elements 604 in each data file 600. The present invention addresses this concern by only classifying/categorizing those data owners 602 and/or data elements 604 that fall within a specific government regulatory standard and/or meet internal classification/categorization guidelines. In specific embodiments of the system, such determinations may be made by accessing a database that lists data elements requiring the second data security classification 608 and the second data security classification(s) 608 to be assigned to those data elements 604.

As previously discussed, in other embodiments of the system, machine learning instructions are included within instructions 510. Machine learning instructions provide for progressively learning, based on data files 600 previously processed by the data classification instructions 510, which data elements 604 require second data security classification 608 and/or the second data security classification 608 to assign to the those data elements 604. In such embodiments of the invention, subsequent determination by the instructions 510 as to which data elements require the second data security classification 608 and which classification 608 to assign to the data element 604 may be a prediction based on the data learned by the machine learning instructions, as well as, in some embodiments other data that heighten the accuracy of the prediction, such as metadata associated with the data file 600 or data elements 604 and/or internally-accessible collaborative metadata collected over time from various metadata sources.

In response to determining the data security classifications 606 and/or 608, the instructions 510 are configured to identify, within the data file, the first and/or second data security classification 606 and/or 608. In specific embodiments of the system 100, tags or the like may be attached to the data file and/or the data elements to identify the first and/or second data security classifications 606 and/or 608. In other embodiments of the system 100, additional fields may be added to the data file 600 with the additional fields identifying the first and/or second data security classifications 606 and/or 608. As previously discussed by providing identification of the first and/or second data security classifications 606 and/or 608 within the data file 600-2 prior to or in-line with firewall processing, the present invention insures that any classified data within an incoming data file is properly identified so that any application or database that comes in contact with the data is aware that the data is classified and, as such, special access, usage and/or storage requirements associated with the classification are to be to adhered to. In addition, the present invention insures that any classified data within an outgoing data file 600-1 is properly identified so that any entity/system within the untrusted external computing network 400 that receives the data file is aware that the data is classified and, as such, special access, usage and/or storage requirements associated with the classification should apply.

Figure 2:
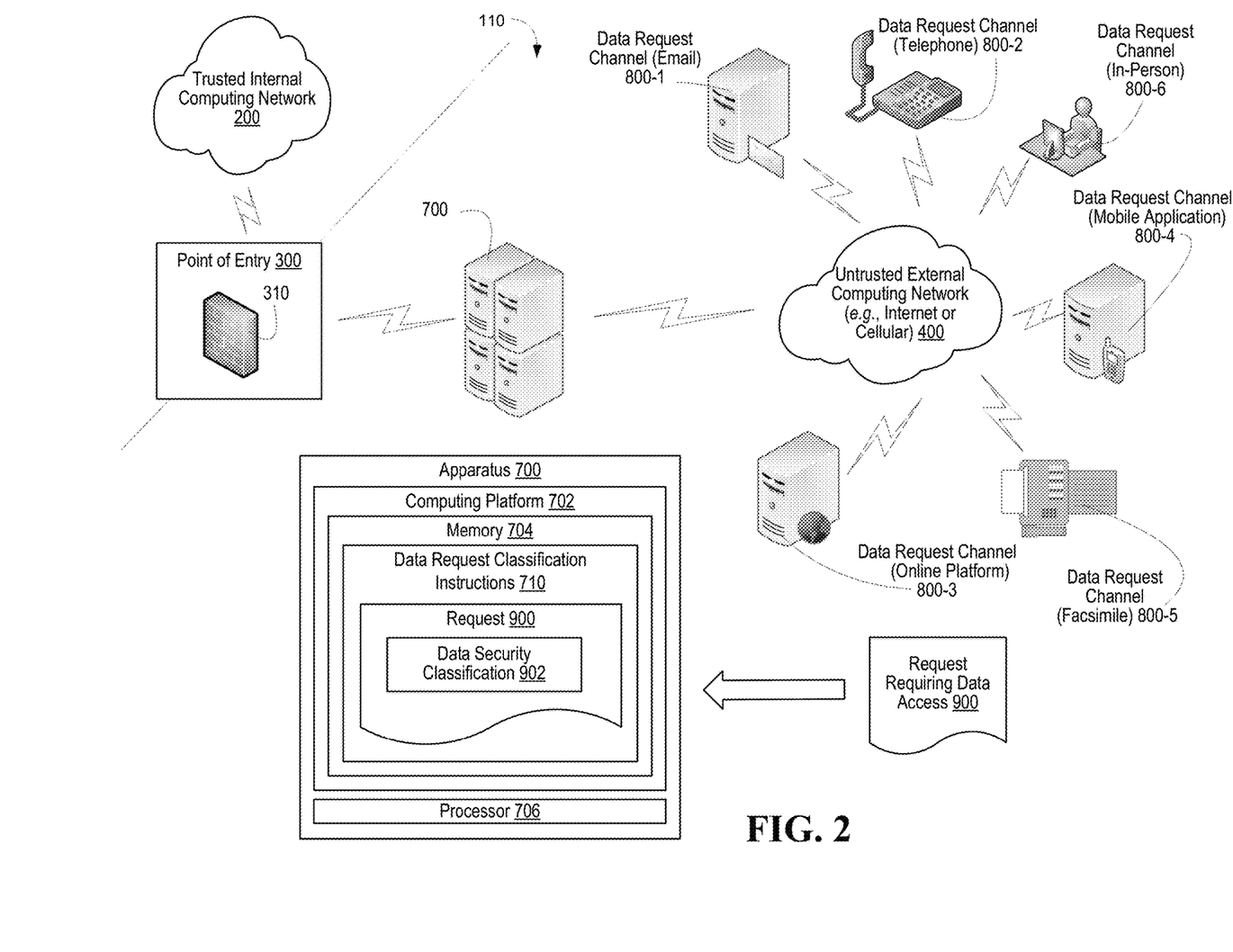
FIG. 2 is a schematic diagram of a system for classifying data requests at or before a data request entry point, in accordance with embodiments of the present invention.

Referring to FIG. 2 a schematic/block diagram is presented of a system 110 for data security and, more specifically, a system 110 for classifying/categorizing requests that require access to classified/categorized data, in accordance with embodiments of the invention. The system 100 includes a trusted internal computing network 200, such as an intranet within an enterprise or the like. The system additionally includes a point of entry 300 to the trusted internal computing network 200. In specific embodiments of the system, the point of entry 200 is a firewall 310 that is the gateway between the trusted internal computing network 200 and the untrusted external computing network 400, such as the Internet or the like. The firewall is configured to monitor and control network traffic. The network traffic includes (i) inbound network traffic from an untrusted external computing network 400 to the trusted internal computing network 200, and (ii) outbound network traffic from the trusted internal computing network 200 to the untrusted external computing network 400.

The system 110 additionally includes an apparatus 700 that is configured to classify/categorize requests 900 requiring access to data prior to or in-line with the point of entry 300, in accordance with embodiments of the present invention. Such classification/categorization of requests requiring access to data at or just prior to the point of entry (e.g., in-line with or prior to the firewall 310) adds a level of assurance that once the request enters the trusted internal computing network, the request is processed in accordance with internal or external rules governing the data requester, the data owner and/or the data being accessed. The data owner, as previously discussed, is the individual or entity that is associated with or possesses the data being requested (e.g., an individual or entity associated with an address, a telephone number, an account number, social security number or the like).

Apparatus 700 which may comprise one or more computing devices, such as servers or the like, may be in direct communication with the point of entry 300. In specific embodiments of the invention (as shown in FIG. 2), the apparatus 700 may be positioned within the untrusted external computing network 400 (or between the untrusted external computing network 400 and the firewall 310) to allow for the classification/categorization of requests 900 prior to the point of entry 300. In other embodiments of the invention, the functionality embodied in apparatus 700 may be performed in-line with functionality performed at the point of entry 300. In such embodiments of the invention, apparatus 700 may be positioned in parallel with the point of entry 300 or the functionality of apparatus 700 may be included in the computing devices comprising the point of entry 300 (thus, obviating the need for apparatus 700).

The apparatus 700 includes a computing platform 702 having a memory 704 and a processor 706 in communication with the memory 704. The memory 704 stores data request classification instructions 710, which are executable by the processor 706. The data classification instructions 710 are configured to receive the requests 900 that require access to data stored within (or accessible to) the trusted internal computing network 200. The request may be any request that requires access to data, referred to herein as an "action", such as but not limited to, a request to access/view data, a request to change data, a request to delete data, a request to use data, or the like. The request 900 may be received from any one of a plurality of different data request channels 800 which are in communication with the untrusted external communication network 400, such as the Internet and/or a cellular communication network. As shown in FIG. 2, the data request channels 800 may include, but are not limited to, electronic mail (email) 800-1, telephone 800-2, online platform 800-3, mobile application 800-4, facsimile 800-5, in-person 800-6 and the like. It should further be noted that requests requiring access to data may come from the data owner or a third-party entity that is otherwise authorized to access one or more data owner's data.

The data request classification instructions 710 are further configured to determine at least one request classification parameters. The request classification parameters may include one or more of (i) an entity making the request, (ii) an origin (location from which the request originates) associated with the request, (iii) the data owner(s) whose data is being accessed, (iv) one or more actions associated with the request, and/or (v) the data elements (i.e., specific data) that is required to be accessed based on the request. The determination may be made from the request itself or data associated with the request (e.g., metadata, IP address, telephone/facsimile number, or the like). In additional embodiments of the system 110, the determination of one or more of the request classification parameters may be made by accessing, within the trusted internal computing network 200, the untrusted external computing network 400 or stored locally within the apparatus 700, a source of truth, such as a database that federates data owners based on previously verified data owner identifying data, such as, but not limited to, verified, name, address, telephone number account number or the like. In further embodiments of the invention, the determination of one or more of the request classification parameters may be made by accessing within the trusted internal computing network 200, the untrusted external computing network 400 or stored locally within the apparatus 700, a collaborative metadata database that includes metadata collected over time from various metadata sources.

In response to determining one or more of the request classification parameters, the instructions 712 determine which request data security classification 902 to assign to the request based on at least one of (i) an entity making the request, (ii) an origin (location from which the request originates) associated with the request, (iii) the data owner (s) whose data is being accessed, (iv) one or more actions associated with the request, and/or (v) the data elements (i.e., specific data) that is required to be accessed based on the request. In specific embodiments of the system 110, such determinations may be made by accessing a database that lists data owners requiring the data security classification and the data security classification(s) associated with those data owners. In other embodiments of the system 110, a rules-based engine is implemented to determine which classification rules (and, thus which data security classification) apply to (i) an entity making the request, (ii) an origin (location from which the request originates) associated with the request, (iii) the data owner(s) whose data is being accessed, (iv) one or more actions associated with the request, and/or (v) the data elements (i.e., specific data) that is required to be accessed based on the request.

In other embodiments of the system 110, machine learning instructions (shown and discussed in greater detail with regards to FIG. 4) are included within instructions 710. Machine learning instructions provide for progressively learning, based on requests 900 previously processed by the data request classification instructions 710, which requests require data security classification 902 and/or the data security classification 902 to assign to the request 900. In such embodiments of the invention, the determination by the instructions 902 as to which data security classification 902 to assign may be a prediction based on the data learned by the machine learning instructions, as well as, in some embodiments, other data that heighten the accuracy of the prediction, such as metadata associated with the request 900 and/or an internally-accessible collaborative metadata collected over time from various metadata sources.

Moreover, the data request classification instructions 710 are further configured to route the request in accordance with the assigned data security classification 902. In specific embodiments of the system 110, the request 900 is routed to a classification-specific queue, which insures that the request is properly handled (i.e., that the request requiring access to data, complies with any internal or external regulations/rules pertaining to the access of data).

Figure 3:
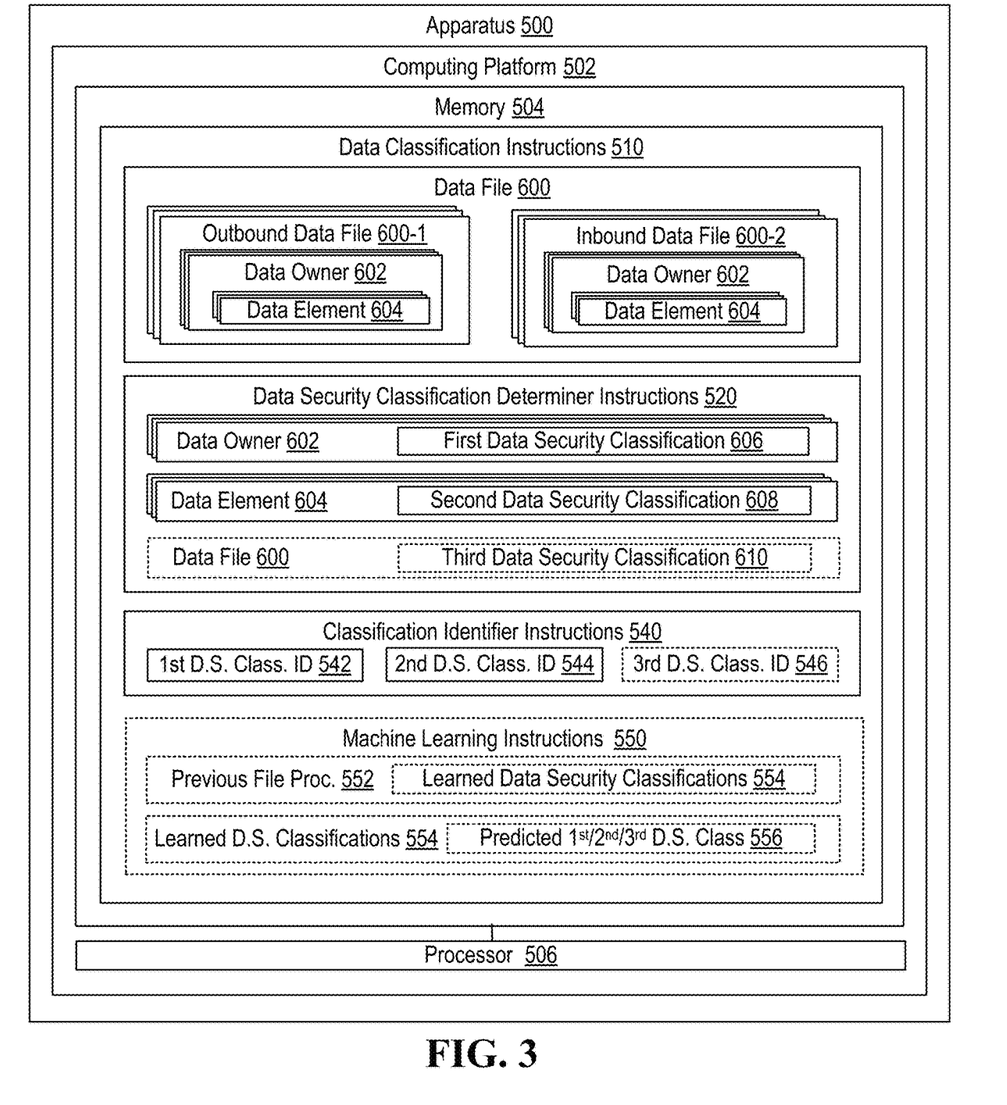
FIG. 3 is a block diagram of an apparatus for classifying data owners and/or data elements in incoming or outgoing data files in-line or pre-firewall, in accordance with some embodiments of the present disclosure.

Referring to FIG. 3 a block diagram of an apparatus 500 configured to provide for classification/categorization of data owners and/or data elements within data files being communicated to and from a trusted internal computing system, in accordance with embodiments of the present invention. In addition to providing greater detail, FIG. 3 highlights various alternate embodiments of the apparatus shown and described in relation to FIG. 1. As previously discussed, the apparatus 500 may include one or multiple different computing devices, such as servers or the like. The apparatus 500 includes a computing platform 502 that includes a memory 504 and at least one processor 506 in communication with the memory 504.

The memory 504 may comprise volatile and non-volatile memory, such as read-only and/or random-access memory (RAM and ROM), EPROM, EEPROM, flash cards, or any memory common to computing platforms. Moreover, memory 504 may comprise cloud storage, such as provided by a cloud storage service and/or a cloud connection service. Processor 506 may be an application-specific integrated circuit ("ASIC"), or other chipset, logic circuit, or other data processing device. Processor 506 may execute one or more application programming interface (APIs) (not shown in FIG. 3) that interfaces with any resident instructions, such as data classification instructions 510. Processor 506 may include various processing subsystems (not shown in FIG. 3) embodied in hardware, firmware, software, and combinations thereof, that enable the functionality of computing platform 502 and the operability of the computing platform 502 on a distributed communication network that provides for communication of data files 600 from and to the trusted internal computing network 200.

Memory 504 of computing platform 502 stores data classification instructions 510 that are configured to classify/categorize data owners and/or data elements in data files being communicated to and from a trusted internal computing network, in accordance with embodiments of the present invention. As previously discussed, the instructions 510 are configured to executed immediately prior to or in-line with a firewall to insure that the proper classification/categorization for data owners and/or data elements is identified before an inbound data file enters the trusted internal computing network or before an outbound data file exits the trusted internal computing network. The instructions 510 includes instructions configured to receive, or otherwise intercept, data files 600 including outbound data files 600-1 being communicated from the trusted internal computing network to the untrusted external computing network and inbound data files 600-1 being communicated from the untrusted external computing network to trusted internal the computing network. As previously described, the data files 600 include one or more data elements 604, which are typically associated with a data owner 602. The data owner 602, as used herein, is the individual or entity that is associated with or possesses a data element 604 (e.g., an individual or entity (i.e., data owner) is associated with/possesses an address, a telephone number, an account number, social security number or the like). In large enterprises, such as financial institutions, retailers or the like, data files containing data owner information are communicated between such enterprises on a regular and ongoing basis.

The instructions 510 include data security classification determiner instructions 520 configured to determine a first data security classification 606 for one or more of the data owners 602 associated with data elements 604 in the received data files 600. In this regard, the instructions 510 are configured to identify which data owners 602 have data elements 604 in the data file and, once the data owners 602 have been identified, determine which data owners 602 are subject to a data security classification/categorization. As previously discussed, not all of the data owners 602 having data elements 604 in a specific data file 600 may be subject to classification/categorization. For example, only data owners that fall within a specific government regulatory standard and/or meet internal classification/categorization guidelines will require classification/categorization.

The data owners 602 within the data file may be identified by verifying one or more identifying data elements 604 in the data file 600, such as name, address, telephone number, account number or the like. Verification may provide for comparing the data elements 604 in the data file 600 to a source of truth, such as database that federates data owners based on previously verified data owner identifying data, such as verified, name, address, telephone number or the like account number.

In response to identifying the data owners, the instructions 520 determine which of the identified data owners 602 require the first data security classification 606 and determine which first data security classification 606 to assign those data owners 602. In specific embodiments of the apparatus, such determinations may be made by accessing a database that lists data owners requiring the first data security classification 606 and the first data security classification(s) 606 to be assigned to those data owners 602.

In other embodiments of the system, machine learning instructions 550 are included within instructions 510. Machine learning instructions provide for progressively learning, based on data files previously processed 552 by the data classification instructions 510, which data owners 602 require first data security classification 606 and/or the first data security classification 606 to assign to the those data owners 602 (i.e., learned data security classifications 554). In such embodiments of the invention, subsequent determination by the instructions 520 as to which data owners 602 require the first data security classification 606 and which first data security 606 classification to assign may be a prediction 556 based on the data learned 554 by the machine learning instructions, as well as, in some embodiments other data that heighten the accuracy of the prediction, such as metadata associated with the data file 600 and/or internally-accessible collaborative metadata collected over time from various metadata sources.

The data security classification determiner instructions 520 are further configured to determine which of the data elements 604 associated the identified data 602 owners require second data security 608 classification and, in response, determine one or more second data security classifications 608 for each of the determined data elements 604. As previously noted, the need for timely and efficient data file communication and processing speed limitations, make it impractical to classify/categorize all the data owners 602 and/or data elements 604 in each data file 600. The present invention addresses this concern by only classifying/categorizing those data owners 602 and/or data elements 604 that require such (i.e., fall within a specific government regulatory standard and/or meet internal classification/categorization guidelines). In specific embodiments of the apparatus 500, such determinations may be made by accessing a database that lists data elements 604 requiring the second data security classification 608 and the second data security classification(s) 608 to be assigned to those data elements 604.

In other embodiments of the apparatus, the machine learning instructions 550 are configured to progressively learn, based on data files previously processed 552 by the data classification instructions 510, which data elements 604 require second data security classification 608 and/or the second data security classification 608 to assign to the those data elements 604 (i.e., learned data security classifications 554). In such embodiments of the invention, subsequent determination as to which data elements require the second data security classification 608 and which classification 608 to assign to the data element 604 may be a prediction 556 based on the data learned 554 by the machine learning instructions, as well as, in some embodiments other data that heighten the accuracy of the prediction, such as metadata associated with the data file 600 or data elements 604 and/or internally-accessible collaborative metadata collected over time from various metadata sources.

In alternate embodiments of the invention, the data security classification determiner instructions 520 are configured to determine if the data file itself requires classification/categorization and, in response, determine one or more third data security classifications 610 for the data file 600. The data file 600 itself may be determined to require classification/categorization based on the overall topic of the data file or the contents of the data file. For example, if the data file is limited to data owners from a particular location/country that are subject to a government issued regulation on data security (e.g., GDPR or the like) the entire data file may be classified/categorized. In specific embodiments of the apparatus 500, such determinations may be made by accessing a database that lists the topics/requirements of data files requiring third data security classification 610 and the third data security classification(s) 610 to be assigned to those data files 610. In specific embodiments, the machine learning instructions 550 are configured to progressively learn, based on data files previously processed 552 by the data classification instructions 510, which data files 600 require third data security classification 610 and/or the third data security classification 610 to assign to the those data files 604 (i.e., learned data security classifications 554). In such embodiments of the invention, subsequent determination as to which data files require the third data security classification 610 and which third data security classification 610 to assign to the data file 600 may be a prediction 556 based on the data learned 554 by the machine learning instructions, as well as, in some embodiments other data that heighten the accuracy of the prediction, such as metadata associated with the data file 600 and/or the internally-accessible collaborative metadata.

In response to determining the data security classifications 606, 608 and/or 610, the classification identifier instructions 540 are configured to identify, within the data file, the first, second and/or third data security classification 606, 608 and/or 610. In specific embodiments of the system 100, tags or the like may be attached to the data file and/or the data elements to identify the first, second and/or third data security classifications 606, 608 and/or 610. In other embodiments of the system 100, additional fields may be added to the data file 600 with the additional fields identifying the first, second and/or third data security classifications 606, 608 and/or 610. As previously discussed by providing identification of the first, second and/or third data security classifications 606, 608 and/or 610 within the data file 600-2 prior to or in-line with firewall processing, the present invention insures that any classified data within an inbound data file 600-2 is properly identified so that any application or database that comes in contact with the data is aware that the data is classified and, as such, special access, usage and/or storage requirements associated with the classification are to be to adhered to. In addition, the present invention insures that any classified data within an outgoing data file 600-1 is properly identified so that any entity/system within the untrusted external computing network 400 that receives the data file is aware that the data is classified/categorized and, as such, special access, usage and/or storage requirements associated with the classification should apply.

Figure 4:
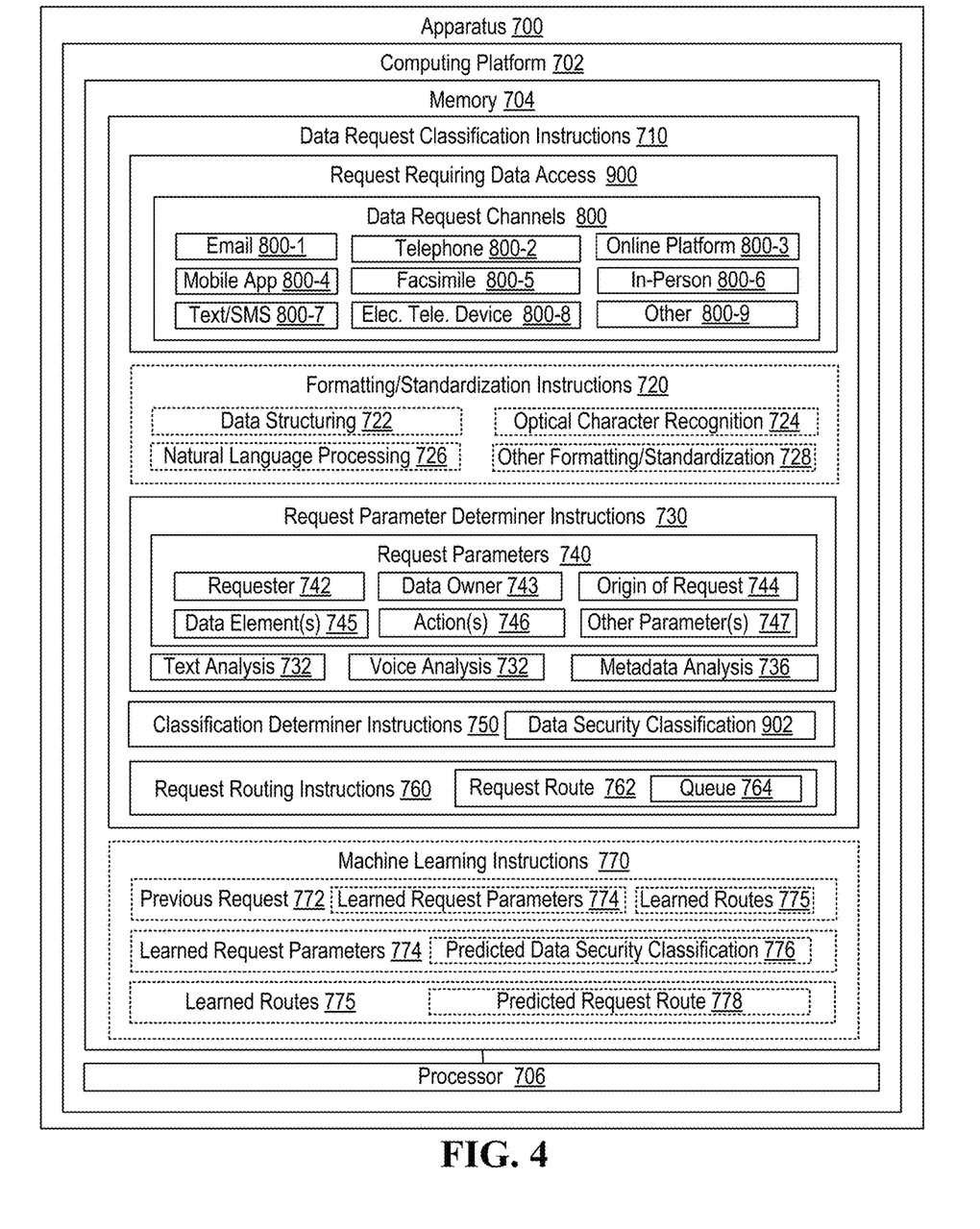
FIG. 4 is a block diagram of an apparatus for classifying data requests at or before a data request entry point, in accordance with embodiments of the present invention.

Referring to FIG. 4 a block diagram of an apparatus 700 configured to provide for classification/categorization of requests requiring access to data, in accordance with embodiments of the present invention. In addition to providing greater detail, FIG. 4 highlights various alternate embodiments of the apparatus shown and described in relation to FIG. 2. As previously discussed, the apparatus 700 may include one or multiple different computing devices, such as servers or the like. The apparatus 700 includes a computing platform 702 that includes a memory 704 and at least one processor 706 in communication with the memory 704.

The memory 704 may comprise volatile and non-volatile memory, such as read-only and/or random-access memory (RAM and ROM), EPROM, EEPROM, flash cards, or any memory common to computing platforms. Moreover, memory 704 may comprise cloud storage, such as provided by a cloud storage service and/or a cloud connection service. Processor 706 may be an application-specific integrated circuit ("ASIC"), or other chipset, logic circuit, or other data processing device. Processor 706 may execute one or more application programming interface (APIs) (not shown in FIG. 4) that interfaces with any resident instructions, such as data request classification instructions 710. Processor 506 may include various processing subsystems (not shown in FIG. 4) embodied in hardware, firmware, software, and combinations thereof, that enable the functionality of computing platform 702 and the operability of the computing platform 702 on a distributed communication network that provides for communication of the requests 900 to the trusted internal computing network 200.

The memory 704 of apparatus 700 stored data request classification instructions 710 that are configured to determine a classification/categorization for a request requiring access to data, in accordance with embodiments of the present invention. The classification/categorization occurs immediately prior to or on-line with a point of entry (e.g., a firewall) to a trusted internal computing network. The instructions are configured to receive, or otherwise intercept, requests requiring access to data associated with a data owner (e.g., personal data, such as name, address, telephone number, account number/information, social security number and the like). The request may be received from various different data requests channels 800. The data request channels may include, but are not limited to, email 800-1, telephone 800-2, online platform 800-3, mobile application 8004, facsimile 800-5, in-person 800-6, text/SMS 800-7, electronic telecommunications device (e.g., Automated Teller Machine) 800-8 and any other channel 800-9 capable of communicating requests 900.

In specific embodiments of the apparatus 700, the instructions 710 include formatting/standardization instructions 720 configured to properly format the requests 900 for subsequent analysis. Formatting and standardization is needed to accommodate the various different data request channels that provide for the requests to be received in different formats, such as text/word format, audio format and the like. The formatting/standardization instructions 720 may include, but is not limited to, data structuring instructions 722, Optical Character Recognition (OCR) instructions 724, Natural Language Processing (NLP) instructions 726 and other formatting and standardization 728.

The instructions 720 further include request parameter determiner instructions 730, which are configured to determine/identify one or more request parameters including, but not limited to, the requester 742, the data owner 743, the origin of the request 744 (location from which the request originates), data elements 745 required to be accessed, one or more actions 746 associated with the request, and/or other parameters 747 associated with the request. In this regard, the instructions 730 may include text analysis instructions 732, voice analysis instructions 732 and metadata analysis instructions 736 configured to analyze the request and determine any one of the aforementioned request parameters. The determination may be made from the request itself or data associated with the request (e.g., metadata, IP address, telephone/facsimile number, or the like). In additional embodiments of the apparatus 700, the determination of one or more of the request classification parameters may be made by accessing, within the trusted internal computing network 200, the untrusted external computing network 400 or stored locally within the apparatus 700, a source of truth, such as a database that federates data owners based on previously verified data owner identifying data, such as, but not limited to, verified, name, address, telephone number account number or the like. In further embodiments of the invention, the determination of one or more of the request classification parameters may be made by accessing within the trusted internal computing network 200, the untrusted external computing network 400 or stored locally within the apparatus 700, a collaborative metadata database that includes metadata collected over time from various metadata sources.

In response to determining one or more of the request classification parameters, the instructions 710 include data security classification determiner instructions 750 configured to determine which data security classification 902 to assign to the request based on at least one of (i) an entity making the request, (ii) an origin (location from which the request originates) associated with the request, (iii) the data owner(s) whose data is being accessed, (iv) one or more actions associated with the request, and/or (v) the data elements (i.e., specific data) that is required to be accessed based on the request. In specific embodiments of the apparatus 700, such determinations may be made by accessing a database that lists data owners requiring the data security classification and the data security classification(s) associated with those data owners. In other embodiments of the apparatus, a rules-based engine (not shown in FIG. 4) is implemented to determine which classification rules (and, thus which data security classification 902) apply to (i) an entity making the request, (ii) an origin (location from which the request originates) associated with the request, (iii) the data owner(s) whose data is being accessed, (iv) one or more actions associated with the request, and/or (v) the data elements (i.e., specific data) that is required to be accessed based on the request.

In other embodiments of the apparatus 700, machine learning instructions 770 are included within instructions 710. Machine learning instructions 770 provide for progressively learning, based on requests 772 previously processed by the data request classification instructions 710, data security classification 774 to assign to the request 900. In such embodiments of the invention, the determination by the instructions 750 as to which data security classification 902 to assign may be a prediction 776 based on the learned data security classifications 774, as well as, in some embodiments, other data that heighten the accuracy of the prediction, such as metadata associated with the request 900 and/or an internally-accessible collaborative metadata collected over time from various metadata sources.

Moreover, the data request classification instructions 710 further include request routing instructions that are configured to determine a route 762 for the request in accordance with the assigned data security classification 902. In specific embodiments of the apparatus 700, the request route 762 is a classification-specific queue 764, which holds the request for subsequent processing in accordance with the assigned data security classification/categorization (i.e., insuring that the request requiring access to data, complies with any internal or external regulations/rules pertaining to the access of data). In optional embodiments of the apparatus 700, the machine learning instructions 770 provide for progressively learning, based on requests 772 previously processed by the data request classification instructions 710, routes 775 to assign to the request 900. In such embodiments of the invention, the determination by the instructions 750 as to which routes 762 to assign may be a prediction 778 based on the learned routes 775, as well as, in some embodiments, other data that heighten the accuracy of the prediction, such as metadata associated with the request 900 and/or an internally-accessible collaborative metadata collected over time from various metadata sources.

Figure 5:
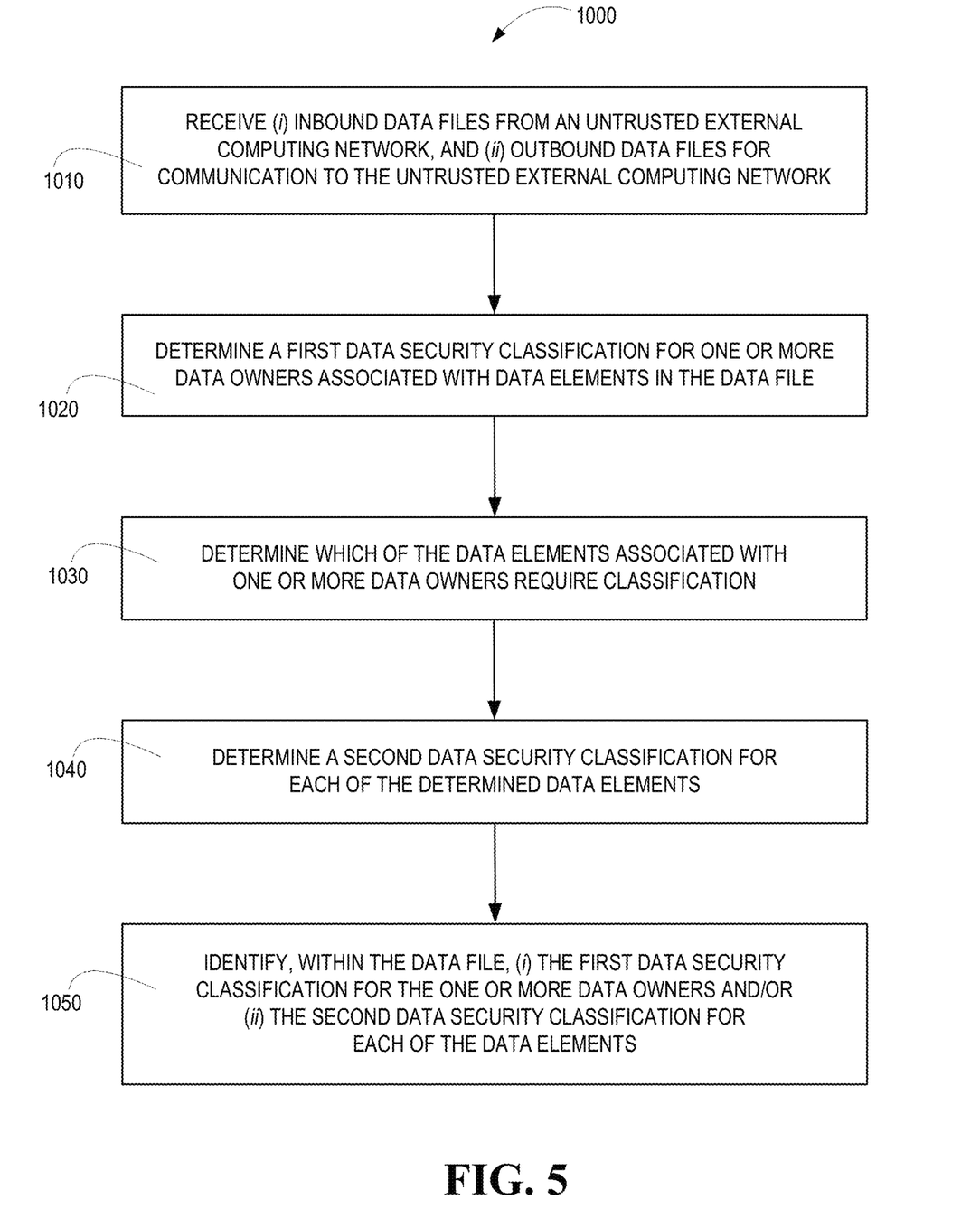
FIG. 5 is a flow diagram of a method for classifying data owners and/or data elements in incoming or outgoing data files in-line or pre-firewall, in accordance with embodiments of the present invention.

Referring to FIG. 5 a flow diagram is present of a method 1000 for classifying data owners and/or data elements in a data file that is being communicated to or from a trusted internal computing system, in accordance with specific embodiments of the present invention. As previously discussed the method, which is a computer-implemented method executed by one or more processors, is executed immediately prior to or in-line with a firewall.

At Event 1010, inbound data files are received from an untrusted external computing network (e.g., Internet) for communication to a trusted internal computing system (e.g., intranet) and outbound data files are received from the trusted internal computing network for communication to the untrusted external computing network. The data files include data elements associated with data owners (e.g., personal data associated with customers or the like). Such data files are communicated between enterprises, such as financial institutions, retailers and the like on a continuous basis.

At Event 1020, the data file is analyzed to determine a first data security classification for one or more data owners associated with data elements in the data file. Data owners may be subject to a first data security classification based on the location of the data owner (e.g., residing in a location/country with data security regulations or the like), previous data breaches affecting the data owner (e.g., internal data security guidelines or the like). In specific embodiments of the invention, the determination is made by identifying/verifying the data owners and accessing a database or applying a rules-based engine that correlates data owners to a need for first data security classification (e.g., location of data owner, internal status of data owner and the like). In other embodiments of the invention, machine learning processing is implemented to learn, over time, from previously processed data files, which data owners require first data security classification and/or the first data security classification(s) assigned to the data owners that require such. Learned data owners and/or learned first data security classifications may be used to predict which data owners require classification and the first data security classification to assign to those data owners.

At Event 1030, a determination is made as to which data elements associated with the data owner are subject to or require second data security classification. In specific embodiments of the invention, such a determination is made by identifying those data elements associated with the data owners and accessing a database or applying a rules-based engine that correlates data owner-specific data elements to rules and/or regulations regarding the need for special handling/storage of the identified data elements.

At Event 1040, once the data elements have been identified, a determination is made as to which classification(s) to assign to the data elements. In specific embodiments of the invention, the determination is made by accessing a database or applying a rules-based engine that correlates data owner-specific data elements to rules and/or regulations defining the classifications (e.g., a name or address may be assigned a lower level of classification/categorization, while an account number or social security number may be assigned a higher classification/categorization). Similar to the determination of first data security classification, the determination of second data security classifications may provide for machine learning processing to learn, over time, from previously processed data files, which data elements require second data security classification and/or the second data security classification(s) to be assigned to the data elements that require such. Learned data elements and/or learned second data security classifications may be used to predict which data elements require classification and the second data security classification to assign to those data elements.

At Event 1050, the first and/or second data security classification is identified within the data file. The first and/or second data security classification may be identified in the data file by tagging data elements with the data security classification(s) and or adding fields to the data file that include the first and/or second data security classification(s).

Figure 6:
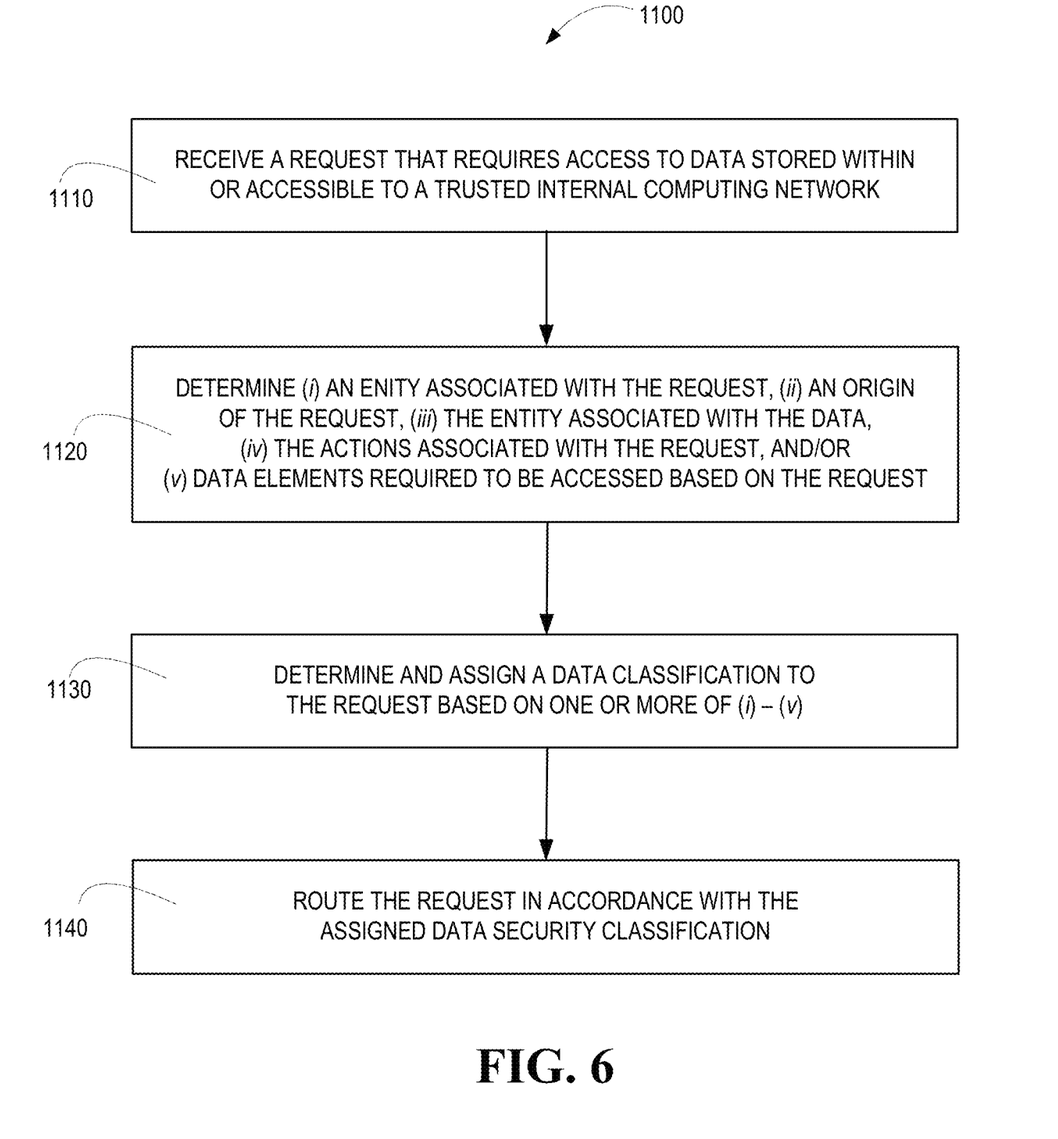
FIG. 6 is a flow diagram of a method for classifying data requests at or before a data request entry point, in accordance with embodiments of the present invention.

Referring to FIG. 6 a flow diagram is present of a method 1100 for classifying requests that require access to data, specifically data that is governed by internal or external data security guidelines/regulations, in accordance with specific embodiments of the present invention. As previously discussed the method, which is a computer-implemented method executed by one or more processors, is executed immediately prior to or in-line with a point of entry, such as firewall or the like.

At Event 1110, a request is received that requires access to data stored within or accessible to a trusted internal computing network. As previously noted the request may be received from various different request channels, including but not limited to, email, text/SMS, online platform, mobile application, telephone, facsimile, in-person (e.g., at internal entity facility), electronic telecommunications device (e.g., ATM) or the like. As such the requests may require formatting/standardization in order for the request to be analyzed.

At Event 1120, one or more request parameters are determined/identified. The request parameters may include, but are not limited to, (i) the requester, (ii) an origin (location from which the request originates) associated with the request, (iii) the data owner(s) whose data is being accessed, (iv) one or more actions associated with the request, and/or (v) the data elements (i.e., specific data) that is required to be accessed. The request parameters may be determined from the body of the request and/or metadata associated with the request, such as IP address, telephone number and the like.

At Event 1130, a data classification is determined and assigned to the data request based on one or more of the previously determined/identified request parameters. In specific embodiments of the invention, the determination is made by accessing a database or applying a rules-based engine that correlates the request parameters to rules and/or regulations defining the classifications. The determination of the data security classification for the request may provide for machine learning processing to learn, over time, from previously processed requests, which requests require data security classification and/or the data security classification (s) to be assigned to the request. Learned data security classifications may be used to predict which requests require classification and the data security classification to be assigned to those requests.

At Event 1140, the request is routed within the trusted internal computing network in accordance with the assigned data security classification. In specific embodiments of the invention, the request is routed to classification-specific queue, which insures that the data in the request is properly handled in accordance with the rules and regulations specified by the assigned data security classification. The determination of the request routing may provide for machine learning processing to learn, over time, from previously processed requests, routes for specific classifications. Learned request routes may be used to predict which route to assign to a specific request.

Thus, present embodiments of the invention providing systems, apparatus methods and/or the like provide for classifying personal data in incoming or outgoing data files at or before a point of entry/exit within an enterprise, such as in-line or pre-firewall. By classifying data before or in-line with firewall monitoring, the present invention insures that data requiring special handling under applicable regulations and/or standards is properly identified and routed to downstream applications and storage locations. Specific embodiments of the invention rely on machine learning processing to progress lively learn and/or assist in predicting which data owners and/or data elements require classification and the classification that is assigned to data owners and/or data elements determined to require classification.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for data security, the system comprising:
   a trusted internal computing network;
   a firewall that monitors and controls network traffic (i) inbound to the trusted internal computing network from an untrusted external computing network, and (ii) outbound from the trusted internal computing network to the untrusted external computing network based on predetermined security rules, wherein the network traffic includes data files comprising a plurality data elements, each data element associated with one of one or more data owners; and
   a computing platform including a memory and at least one processor in communication with the memory, wherein the memory stores first instructions and machine learning instructions that are executable by the at least processor, wherein the first instructions are configured to:
      receive (i) inbound ones of the data files, and (ii) outbound ones of the data files,
      determine a first data security classification for at least one of the one or more data owners associated with the data elements in the received data files,
      determine which of the data elements associated with the at least one of the one or more data owners require classification,
      determine a second data security classification for each of the determined data elements, and
      identify, within the data file, at least one selected from the group of (i) the first data security classification for the at least one of the one or more data owners, and (ii) the second data security classification for the each of the determined data elements,
      wherein the first instructions are executed prior to or in-line with the firewall monitoring and controlling the network traffic,
   wherein the machine learning instructions configured to;
      progressively learn at least one selected from the group of first data security classifications for data owners and second data security classifications for data elements associated with the data owners based on previous processing of data files by the instructions, and
      in response to failing to determine the at least one selected from the group of the first data security classification and the second data security classification based on the first and second data security classifications learned by the machine learning instructions, predict at least one selected from the group of the first data security classification and the second data security classification based on (i) learned classifications of other data files, (ii) metadata included in the data file, and (iii) composite metadata compiled within the trusted internal computing network,
   wherein at least one selected from the group of the first data security classification and the second data security classification are determined by the first instructions based on the first and second data security classifications learned by the machine learning instructions.

2. The system of claim 1, wherein the first instructions are further configured to determine at least one selected from the group of the first data security classification and the second data security classification by accessing at least one database that stores data owner classifications and data element classifications.

3. The system of claim 1, wherein the first instructions are further configured to determine a third data security classification for the data file and identify, within the data file, the third data security classification for the data file.

4. The system of claim 3, wherein the machine learning instructions are further configured to progressively learn third data security classifications for the data files based on previous processing of data files by the first instructions.

5. The system of claim 4, wherein the first instructions are further configured to determine the third data security classification based on the third data security classifications learned by the machine learning instructions and wherein the machine learning instructions are further configured to, in response to failing to determine the third data security classification based on the third data security classifications learned by the machine learning instructions, predict the third data security classification based on least one selected from the group of (i) learned classifications of other data files, (ii) metadata included in the data file, and (iii) composite metadata compiled within the trusted internal computing network.

6. The system of claim 1, wherein the first instructions are further configured to identify, within the data file, the second data security classification for the each of the determined data elements by tagging metadata associated with each of the determined data elements.

7. The system of claim 1, wherein the first instructions are further configured to identify, within the data file, at least one selected from the group of (i) the first data security classification for the at least one of the one or more data owners, and (ii) the second data security classification for the each of the determined data elements by adding data fields to the data file.

8. The system of claim 1, wherein the first instructions are further configured to determine at least one selected from the group (i) one or more applications within the trusted internal computing network that use the determined data elements, and (ii) one or more storage location associated with the trusted internal computing network that is impacted by the second data security classification.

9. The system of claim 1, wherein the first instructions are further configured to notify the determined (i) one or more applications and (ii) one or more storage locations of impending use or receipt of the determined data elements.

10. The system of claim 1, wherein the second data security classification for the each of the determined data elements define one or more rules associated with the protection of the determined data elements, wherein the one or more rules include at least one selected from the group of (i) rules defining where a data element can be stored, (ii) rules defining where a data element can be used, (iii) rules defining how a data element can be used, (iv) rules defining entities authorized to access or use a data element, (v) rules defining third-party requests to access or use a data element, (vi) rules defining statistical use of a data element, and (vii) rules defining encryption requirements for a data element.

11. The system of claim 1, wherein the first instructions are further configured to validate the determined data elements by accessing a source of truth database to compare the determined data elements to previously verified data elements.

12. The system of claim 11, wherein the first instructions are further configured to prevent one or more of the determined data elements that have been determined to be invalid from entering the trusted internal computing network.

13. An apparatus configured for data security, the apparatus comprising:
a computing platform including a memory and at least one processor in communication with the memory;
first instructions stored in the memory that are executable by the at least processor and configured to:
receive (i) inbound data files from an untrusted external computing network, and (ii) outbound data files for communication to the untrusted external computing network,
determine a first data security classification for at least one of the one or more data owners associated with the data elements in the received data files,
determine which of the data elements associated with the at least one of the one or more data owners require classification,
determine a second data security classification for each of the determined data elements, and
identify, within the data file, at least one selected from the group of (i) the first data security classification for the at least one of the one or more data owners and (ii) the second data security classification for the each of the determined data elements,
wherein the instructions are executed prior to or in-line with a firewall monitoring and controlling inbound and outbound communications between a trusted internal computing network and an untrusted external computing network; and
machine learning instructions stored in the memory that are executable by the at least processor and configured to:
progressively learn at least one selected from the group of first data security classifications for data owners and second data security classifications for data elements associated with the data owners based on previous processing of data files by the instructions, and
in response to failing to determine the at least one selected from the group of the first data security classification and the second data security classification based on the first and second data security classifications learned by the machine learning instructions, predict at least one selected from the group of the first data security classification and the second data security classification based on (i) learned classifications of other data files, (ii) metadata included in the data file, and (iii) composite metadata compiled within the trusted internal computing network,
wherein at least one selected from the group of the first data security classification and the second data security classification are determined by the first instructions based on the first and second data security classifications learned by the machine learning instructions.

14. A computer-implemented method for providing data security, the computer-implemented method is implemented by one or more processing devices and comprising:
(a) receiving (i) inbound data files from an untrusted external computing network, and (ii) outbound data files for communication to the untrusted external computing network;
(b) determining a first data security classification for at least one of the one or more data owners associated with the data elements in the data files;
(c) determining which of the data elements associated with the at least one of the one or more data owners require classification;
(d) determining a second data security classification for each of the determined data elements;
(e) identify, within the data file, at least one selected from the group of (i) the first data security classification for the at least one of the one or more data owners and (ii) the second data security classification for the each of the determined data elements,
wherein steps (a)-(e) are performed prior to or in-line with a firewall monitoring and controlling inbound and outbound communications between a trusted internal computing network and the untrusted external computing network;
(f) progressively learning at least one selected from the group of first data security classifications for data owners and second data security classifications for data elements associated with the data owners based on previous processing of data files by the instructions, and
(g) in response to failing to determine the at least one selected from the group of the first data security classification and the second data security, predicting at least one selected from the group of the first data security classification and the second data security classification based on (i) learned classifications of other data files, (ii) metadata included in the data file, and (iii) composite metadata compiled within the trusted internal computing network,
wherein at least one selected from the group of the first data security classification and the second data security classification are determined based on the first and second data security classifications learned by the machine learning instructions.

* * * * *